United States Patent
Dezonno et al.

(10) Patent No.: US 7,917,623 B2
(45) Date of Patent: Mar. 29, 2011

(54) METHOD OF ALLOCATING DATA COMMUNICATION SESSIONS BASED UPON USER INFORMATION

(75) Inventors: Anthony Dezonno, Bloomingdale, IL (US); Craig R. Shambaugh, Wheaton, IL (US); Marshall Ball, Naperville, IL (US); Michael C. Hollatz, Huntley, IL (US)

(73) Assignee: Aspect Software, Inc., Lombard, IL (US)

( * ) Notice: Subject to any disclaimer, the term of this patent is extended or adjusted under 35 U.S.C. 154(b) by 1087 days.

(21) Appl. No.: 10/037,998

(22) Filed: Jan. 3, 2002

(65) Prior Publication Data

US 2003/0126206 A1 Jul. 3, 2003

(51) Int. Cl.
*G06F 15/173* (2006.01)
(52) U.S. Cl. ........ 709/226; 709/203; 709/206; 709/227; 709/228; 709/238
(58) Field of Classification Search .................. 709/226, 709/206, 220; 707/6; 713/176
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,884,032 A * | 3/1999 | Bateman et al. | 709/204 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,049,821 A * | 4/2000 | Theriault et al. | 709/203 |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,513,060 B1 * | 1/2003 | Nixon et al. | 709/203 |
| 6,684,250 B2 * | 1/2004 | Anderson et al. | 709/225 |
| 6,732,156 B2 | 5/2004 | Miloslavsky | |
| 6,785,659 B1 * | 8/2004 | Landsman et al. | 705/14 |
| 6,804,668 B1 * | 10/2004 | Shambaugh et al. | 707/6 |
| 2002/0161896 A1 * | 10/2002 | Wen et al. | 709/227 |
| 2003/0110079 A1 * | 6/2003 | Weisman et al. | 705/14 |
| 2008/0071917 A1 * | 3/2008 | Petrovykh | 709/230 |

* cited by examiner

*Primary Examiner* — Yves Dalencourt
(74) *Attorney, Agent, or Firm* — Husch Blackwell LLP

(57) ABSTRACT

A method and apparatus are provided for establishing communication sessions through the Internet. The method includes the steps of receiving a request from an Internet requester by a website for a communication session with an agent of the website, analyzing browser associated information relating to the request and selecting an agent for the communication session based upon a content of the analyzed browser associated information.

36 Claims, 1 Drawing Sheet

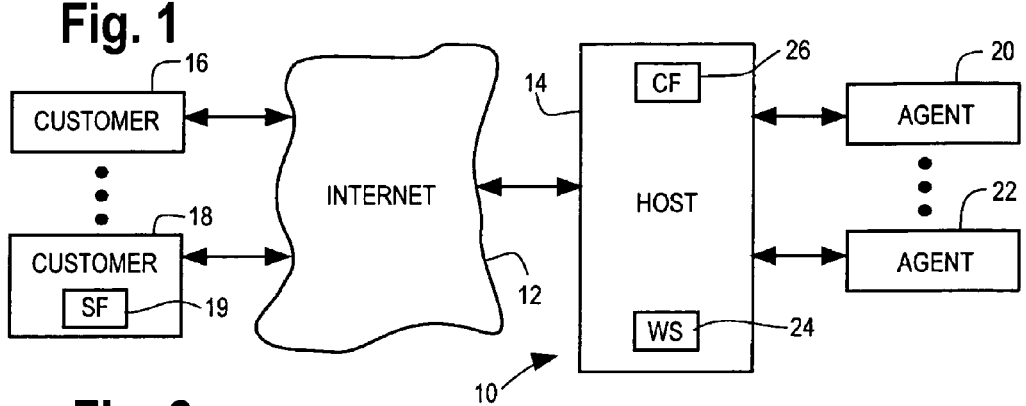
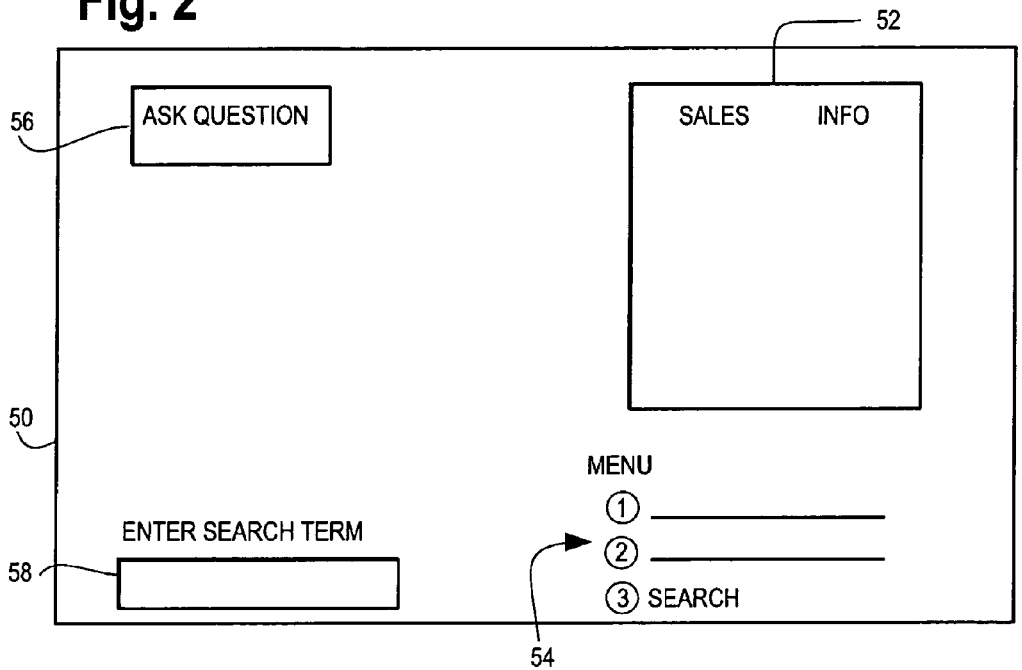
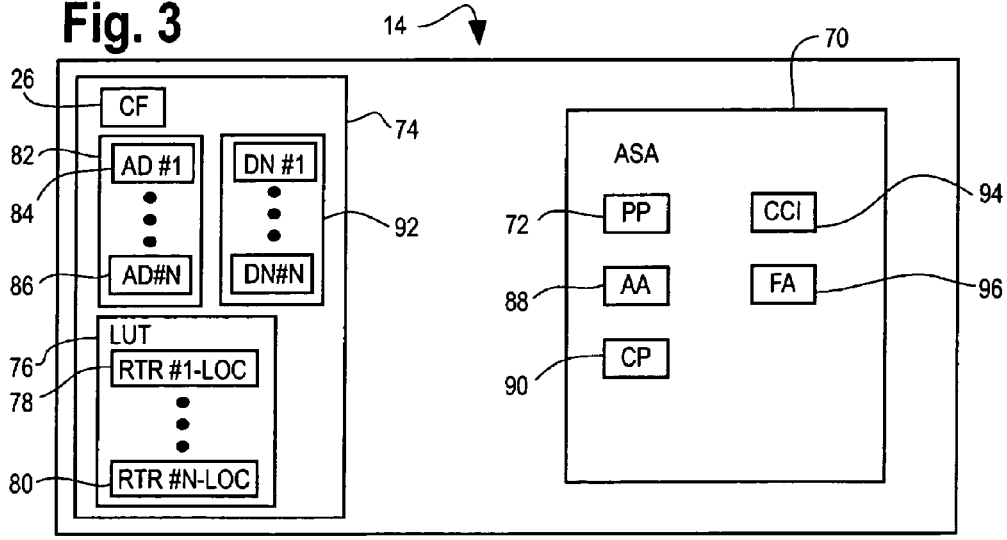

US 7,917,623 B2

METHOD OF ALLOCATING DATA COMMUNICATION SESSIONS BASED UPON USER INFORMATION

FIELD OF THE INVENTION

The field of the invention relates to the Internet and more particularly to "chat sessions" among Internet users.

BACKGROUND OF THE INVENTION

Chat rooms and chat sessions on the Internet are concepts that are generally well understood and used by many people. Chat rooms are typically provided through a web site, a portion of a web site or as an online service provided by an Internet service provider (ISP) such as America Online. A chat room provides a venue for communities of users with a common interest to communicate in real time. In contrast, forums and discussion groups allow users to post messages, but do not have the ability to provide interactive messaging.

The use of chat sessions has also be adopted by some organizations (e.g., merchants, political organizations, etc.) operating web sites as a means of increasing the impact of a web site. Typically, the web site provides one or more web pages touting the benefits of the organization. On one of the web pages a softkey may be provided with the label "chat with us".

If a user (e.g., a customer) activates the softkey, the customer is placed into contact with an agent of the organization for a private chat session. Once placed into contact with an agent, the customer may ask questions and receive specific answers to those questions, usually through the exchange of short text messages.

While the concept of private chat sessions works well, the agent is often hampered by a lack of information about the customer. Because of the lack of information, a simple, albeit ambiguous, question from a customer may elicit an improper response, leading to the creation of a negative impression in the mind of the customer. Because of the importance of the Internet and the promotion of organizational activities, a need exists for a better method of interacting with customers.

SUMMARY OF THE INVENTION

A method and apparatus are provided for establishing communication sessions through the Internet. The method includes the steps of receiving a request from an Internet requester by a website for a communication session with an agent of the website, analyzing browser associated information relating to the request and selecting an agent for the communication session based upon a content of the analyzed browser associated information.

BRIEF DESCRIPTION OF THE DRAWINGS

FIG. 1 is a block diagram of a message exchange system in accordance with an illustrated embodiment of the invention;

FIG. 2 depicts a web page that may be used by the system of FIG. 1; and

FIG. 3 is a block diagram of the host of FIG. 1.

DETAILED DESCRIPTION OF AN ILLUSTRATED EMBODIMENT

FIG. 1 is a block diagram of a message exchange system 10, shown generally under an illustrated embodiment of the invention. The message exchange system 10 is intended primarily for the private exchange of text, video and/or audio information between two users. The message exchange system 10 may be used by an organization (e.g., a merchant, a political organization, etc.) to setup message exchange (e.g., "chat" or video) sessions through the Internet between an external client of the organization and a selected agent of the organization for purposes of advancing the agenda of the organization.

For example, where the organization is a merchant, the message exchange system 10 may be structured around a website 24, that is provided to promote the wares of the merchant. For example, the merchant may advertise the Internet address (i.e., the URL) of the website 24 through television or newspaper. Alternatively, the organization may set up links to the website 24 from search engines or from the websites of other merchants selling related merchandise.

To access the website 24, a customer may simply activate a browser on his terminal 16, 18 and enter the URL of the website 24. Upon activating an ENTER button, the browser within the customer's terminal 16, 18 may compose an access request and forward the access request to the host 14. Upon receiving the information request, the host 14 may decode the access request and recover the URL of the website 24 and a URL of the customer 16, 18.

Upon decoding and recognizing from the URL that the access request is intended for the website 24, the host 14 may forward the access request to the application providing the functionality of the website 24. In addition to routing access and information requests, the host 14 may also function to open files and track website usage. To this end, the host 14 may open a contact file 26 based upon the URL of the customer 16, 18.

The website 24 upon receiving and decoding the information request may download an html document (e.g., webpage 50, FIG. 2) to the customer's terminal 16, 18. Included within the web page 50 may be text and graphical information. For example, the web page 50 may include sales information 52 and a series of menu options 54. Menu options may include hyperlinks to different lines of merchandise and, possibly a search option. If a search option is provided, a text box 58 may be provided for entry of search terms.

The web page 50 may also include an ASK QUESTION soft key 56. Activation of the ASK QUESTION soft key 56 may be regarded by the host 14 as an agent request and used as an indication that a customer 16, 18 has a specific question to ask an agent 20, 22 or that the customer 16, 18 wishes to place an order. In either case, the host 14 may take specific steps (discussed in more detail below) to determine which agent is best suited to service the customer 16, 18.

In order to enhance the functionality of a webpage 50, the website 24 may include one or more processing routines (e.g., Java scripts) associated with predetermined areas of the web page 50. For example, positioning of a cursor over a particular menu option may activate a first Java script that causes the customer's browser to send a URL associated with that menu selection back to the website 24. Alternatively, entry of text into a text box 58 and activation of the SEARCH soft key may activate another Java script that collects the entered text and sends it to a search engine associated with the website 24.

Upon receiving and reviewing the web page 50, the customer 16, 18 may review the sales information and may make a menu selection for more information. Upon making a menu selection, the user's browser may forward the menu selection to the website 24. The website 24 may receive and process the menu selection and may download a second web page 50.

In addition to downloading web pages 50, the website 24 may also transfer information to the host 14 regarding website use by the customer 16, 18. The website use may include any web pages 50 visited along with any information entered through text boxes 58. The host 14 may receive the information and add it to the contact file 26 created for the customer 16, 18.

In addition to visiting a number of web pages 50, the customer 16, 18 may decide that he has a question and may activate the ASK QUESTION soft key 56. The website 24 may receive the request and forward the agent request (along with the URL of the customer 16, 18) to an agent selection application (ASA) 70 (FIG. 3) within the host 14.

Before determining which agent 20, 22 to assign to the customer 16, 18, the host 14 may first recover and process browser associated information. Browser associated information may be obtained from a number of sources. As used herein, browser associated information relating to the request means information delivered to a server along with the information request from the browser, router information retrieved by the server based upon the URL of the browser or information retrieved by the server from the browser about communication sessions with other servers.

As a first step, a packet processor (PP) 72 within the ASA 70 may analyze browser associated information to identify a location and a domain name of the sender. Identification and knowledge of the location of the customer 16, 18 may allow the host 14 to select an agent 20, 22 who is physically present in the same locale as the customer 16, 18. The selection of a local agent 20, 22 may be a significant element in achieving customer satisfaction because of the personal knowledge that a local agent 20, 22 may have about local suppliers of the organization.

Once the locale of the customer 16, 18 has been determined, then the ASA 70 may attempt to correlate a domain name (from the URL of the customer 16, 18) with organizations within that local. While some domain names (e.g., AOL) are nonspecific with regard to location, other domain names (e.g., Rockwell) can be correlated to a specific company and location based upon the nearest router switch and, possibly, the domain name of the company embedded within the identifier of the router.

The correlation of a domain name used by the customer 16, 18 with a location may be important in selecting an agent with a proper training to service the customer. For example, some customers 16, 18 may be employees of large companies that do business with the organization controlling the message exchange system 10. In achieving customer satisfaction with large companies, the host 14 must be able to identify queries from those companies and select an agent trained in the specifics of the relationship with that company.

The analysis of the browser associated information and determination of the location of the sender (i.e., the customer 16, 18) may be determined, on a first level, by identifying the packet switches through which the access request passed on its way from the sender 16, 18 to the website 24. The path may be determined from the URL of the browser by using the well-known "TRACEROUTE" utility. For example, Windows 95, 98, NT and 2000 include a traceroute utility called tracert. The route of an access request may be determined by opening a DOS or command prompt window, and entering "tracert" followed by the IP number or domain name of the host serving the customer 16, 18. A set of router identifiers (path identifiers) may be returned and stored in the contact file 26.

The path identifiers provide a list of the identities of the Internet routers that the access request traversed from the sender (customer 16, 18) to the web site 24. From the path identifiers, the PP 72 may retrieve an identifier of the first router that the access request passed through on its way from the customer 16, 18 to the website 24. By knowing a location of a router closest to the customer 16, 18, the ASA 70, by inference, also knows the relative location of the customer 16, 18. Further, where the first router is part of a private network, the identifier of the router typically contains the name of the owner of the private network.

The actual location of the first router may be determined based upon prefixes appended to the router identifiers or by reference to a router location lookup table 76 within memory 74. When using the lookup table 76, the PP 72 may simply enter the table with the router identifier and search a set of files 78, 80 for a matching router identifier and retrieve the associated location stored within that same file.

Once the location of the customer 16, 18 is determined, the ASA 70 may select an agent 20, 22 based upon the proximity of the agent 20, 22 to the customer 16, 18. To select an agent, an agent analyzer (AA) 88 may enter an agent location lookup table 82 containing information on agent location and other agent information. Using the location of the first router, the AP 88 may select the agent 20, 22 in the same locale as the customer 16, 18 to handle the communication session.

To further enhance agent selection, the PP 72 may compare a domain name of the URL with a list 92 of domain names and locations of known customers. Where a match is found, the criteria for selection of the agent 20, 22 may be further based upon a skill or prior training in handling the specific problems associated with that customer at that location.

To initiate the contact, the AA 88 may transfer a URL of the selected agent 20, 22 to a communication processor (CP) 90 within the host 15 along with the URL of the requesting customer 16, 18. The CP 90 may retrieve additional information from the contact file 26 including any web pages 50 visited and also an identifier of the web page 50 from which the communication session request originated. The host 14 may compose a packet message, including the contact information and forward the composed packet message to the selected agent 20, 22. Upon receiving the message, a terminal 20, 22 of the selected agent may automatically initiate a communication session with the requesting customer 16, 18 while at the same time displaying the transferred contact information.

Under another illustrated embodiment of the invention, browser associated information may exist in the form of shared files 19 (FIG. 1) that may be used to determine and control agent selection. Under the illustrated embodiment, files 19 (e.g., directories) within the terminal 16, 18 of the customer may be made available for analysis by the host 14. Analysis of shared files may be used to enhance customer satisfaction by providing information regarding the context of the customer's agent request (e.g., the customer's communication preferences, the customer's visits to other websites, etc.).

Sharing may be accomplished under a format similar to that developed for sharing music. Software for sharing files may be downloaded from any of a number of sources (e.g., napster.com, kazaa.com, etc.).

Under the shared file format, a customer 16, 18, in return for certain financial or service incentives, may download the file sharing software from the sources referenced above or from the website 24. In preparation for accessing the website 24, the customer 16, 18 may designate (through his browser) the paths to certain files (or folders) that are to be designated as being shared files. In an analogy to Napster, the shared files would be the directories to shared music and the shared music files. Under the illustrated embodiment, the shared files are file directories related to communication activity (e.g., "C:\WINDOWS\History", "C:\WINDOWS\Recent", "C:\WINDOWS\Cookies", "C:\WINDOWS\MEDIA" etc.).

Shared files under illustrated embodiments of the invention are used for an entirely different purpose than under the prior art. Under the prior art, shared files represent information received from outside sources. Under the illustrated embodiments, shared files, with the exception of cookies, are files generated by the user's browser.

Further, the use of the shared files herein is also different from the prior use of "cookies". For example, shared files are available herein to any website 24 that identifies itself as being part of that same shared file network. In contrast, (and except as noted below) a cookie is only supposed to be available to the website depositing the cookie.

By making the files and file directories related to communication activity available to the ASA 70, the host 14 may be able to improve customer service drastically. For example, if the ASA 70 is able to identify shared files with an "MPEG" file extension, then the ASA 70 may use such information to verify that the customer 16, 18 has video conferencing software. If the ASA 70 can verify that the customer 16, 18 has video conferencing software, then the ASA 70 may select an agent 20, 22 that also has video conferencing software and a high-speed connection to the Internet sufficient to service that software.

In order to use the information from the shared files, a file analyzer (FA) 96 may compare the file extensions of the shared files with a communications capability index (CCI) 94. Within the CCI 94, the file extensions may be used to retrieve a specific set of communications capability that an agent may need to effectively communicate with the requester 16, 18.

For example, if the file extensions indicate that the requester 16, 18 has the capability of using Voice-over-Internet Protocol (VoIP), then the FA 96 may further access the "MEDIA" file of the requester 16, 18 to determine the VoIP software supplier and revision level used by the requester 16, 18. With a supplier and revision level, the FA 96 may transfer the file information to the AA 88 as further criteria for selection of an agent 20, 22.

The AA 88 may access the agent table 82 using the additional information from the shared files. Within the agent table 82, the AA 88 may search for an agent 20, 22 with a compatible VoIP application and Internet service sufficient to service the customer 16, 18. Upon locating and selecting an agent 20, 22, the AA 88 may transfer the identifier of the customer 16, 18 to the selected agent 20, 22 along with instructions to active the compatible VoIP application. As described above, the contents of the contact file 26 may also be transferred to the selected agent for use during the session.

Similarly, the FA 96 may identify shared files with a JPEG or MPEG extension. As above, the FA 96 may identify a software supplier and version available to the customer 16, 18 and may transfer any identified information to the AA 88.

The AA 88 may access the agent files 82 to identify an agent with similar JPEG or MPEG software and an Internet connection capable of supporting such a connection. Upon selection of an agent 20, 22, the AA 88 transfers information to the agent 20, 22 and the communication session begins.

By accessing the directories of other Internet contacts (e.g., "C:\WINDOWS\History", "C:\WINDOWS\Recent", "C:\WINDOWS\Cookies", etc.), the ASA 70 may also be able to identify customers 16, 18 that are in the mood to buy. For example, if a contact list contains paths (URLs) to webpages of competitors, then the ASA 70 may consider the customer 16, 18 a better prospect for closing a sale and may select a more qualified agent than would otherwise be chosen.

Alternatively, where the organization using the system 10 sells many products, the path content of the contact list may provide information of a particular product (e.g., a URL of a webpage) that the customer 16, 18 is interested in from prior contacts. The knowledge of customer interest may be used to ensure that the proper agent 20, 22 is selected in advance of the communication contact.

In another illustrated embodiment of the invention, the ASA 70 may retrieve cookies left by competitors, without the need for a shared file format. As has been described from any of a number of sources (e.g., the website, "www.peacefire.org/security/iecookies") a website can read Internet Explorer cookies set from any domain. For example, for a website named "peacefire.org" to read cookies left on a browser by "amazon.com", the website would direct the user's browser to peacefire.org%2fsecurity%2fiecookies%2fshowcookie.html%3F.amazon.com org%2fsecurity%2fiecookies%2fshow cookie.html%3F.amazon.com". The substitution of "%2f" for "/" and "%3F" for "?" allows the website "peacefire.org" to download cookies left by "amazon.com".

Using similar methods, the website 24 may download cookies left by competitors in the browsers of the customers 16, 18. The downloading of cookies left by competitors allows the ASA 70 to select an agent 20, 22 familiar with competitor's products and the ability to anticipate the customer's questions, thereby increasing the odds of completing a sale.

Specific embodiments of methods and apparatus for establishing communications sessions through the Internet according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of establishing communication sessions through the Internet, such method comprising:
  receiving a request from a browser of an Internet requester currently accessing a website of an organization via the browser, the request activated by the requester without entry by the requester of requester identification and location and forwarded to the organization by the browser to request a communication session with a human agent of the website;
  automatically recovering and analyzing browser associated information not entered by the requester relating to the request, without prompting the requestor for requester identification and location, prior to human agent assignment from the browser request by using a processor, wherein the browser associated information includes information delivered with the request, router information retrieved based upon a URL of the browser and information retrieved from the browser about other communications sessions, and wherein the step of analyzing browser associated information further comprises automatically retrieving a list of router identifiers defining a path from the Internet requester to the website; and
  selecting a human agent for the communication session automatically based upon a content of the analyzed browser associated information.

2. The method of establishing communication sessions as in claim 1 further comprising identifying a locale of an IP packet router in a closest relative location to the requester and selecting the human agent based on proximity of the human agent to the requestor using the identified locale as the closet relative location to the requestor.

3. The method of establishing communication sessions as in claim 2 wherein the step of selecting the agent further comprises identifying the identified locale of the closest relative router by identifying packet switches through which the request passed from the requester to the website and determining an identifier of a first router that the request passed through from the requester.

4. The method of establishing communication sessions as in claim 2 wherein the step of analyzing browser associated information further comprises determining an organizational affiliation of the requester from the identified locale and a domain name of the request, and selecting the human agent based on the determined organizational affiliation.

5. The method of establishing communication sessions as in claim 4 wherein the step of selecting an agent further comprises retrieving a list of agents qualified to service communication sessions with the determined organization.

6. The method of establishing communication sessions as in claim 5 further comprising transferring a URL of the requester to the selected agent.

7. The method of establishing communication sessions as in claim 1 further comprising making available to the website a set of requestor designated shared files, related to communication activity of the requester and not including cookies, generated by a browser of the requester when the website identifies itself as being part of an associated file sharing network, and using the shared file to determine and control agent selection.

8. The method of establishing communication sessions as in claim 7 further comprising detecting a set of file extension of the shared files, comparing the file extensions with a communications capability index and using the file extension to retrieve a specific set of communication capabilities that the human agent needs to effectively communicate with the requester.

9. The method of establishing communication sessions as in claim 8 further comprising comparing the file extensions with a communications capability index.

10. The method of establishing communication sessions as in claim 9 wherein the step of selecting the agent further comprises searching for an agent with a communication capability index substantially equal to the requester.

11. The method of establishing communication sessions as in claim 7 further comprising accessing requester contact lists containing URL's to web pages of competitors among the shared files, detecting a URL of a competitor including an identifier of a webpage of a specific product of the competitor, and selecting the agent based on the specific product.

12. The method of establishing communication sessions as in claim 1 wherein the website retrieves cookies left by competitors in the browser of the requestor and the agent is selected based upon the agents familiarity with products of the competitor determined from the retrieved cookies.

13. The method of establishing communication sessions as in claim 1 further comprising comparing a domain name of a URL of the requester with a list of domain names and locations of known customers and detecting any matching customers and locations, and wherein the step of selecting the agent further comprises searching for an agent with knowledge of any problems associated with matched customers and locations.

14. An apparatus for of establishing communication sessions through the Internet, such apparatus comprising:
   means for receiving a request from a browser of an Internet requester currently accessing a website, the request activated by the requester without entry by the requestor of requester identification or location and forwarded to the website by the browser to the request a communication session with a human agent of the website;
   means for analyzing browser associated information relating to the request, prior to an agent assignment, to identify a location of the requester without requesting entry of the requester identification or location wherein the browser associated information includes information delivered with the request, router information retrieved based upon a URL of the browser and information retrieved from the browser about other communications sessions, and wherein the means for analyzing browser associated information automatically retrieves a list of router identifiers defining a path from the Internet requester to the website; and
   means for automatically selecting a human agent for the communication session prior to establishing the communication session based upon a content of the analyzed browser associated information and the location.

15. The apparatus for establishing communication sessions as in claim 14 further comprising means for identifying a locale of an IP packet router in a closest relative location to the requester by determining a router identifier of a first router that the request passed through from the requester from the list of router identifiers.

16. The apparatus for establishing communication sessions as in claim 15 wherein the means for selecting the agent further comprises means for identifying an agent in the identified locale of the closest relative router.

17. The apparatus for establishing communication sessions as in claim 16 wherein the means for analyzing browser associated information further comprises means for determining an organizational affiliation of the requester from a domain name of the request.

18. The apparatus for establishing communication sessions as in claim 17 wherein the means for selecting an agent further comprises means for retrieving a list of agents qualified to service communication sessions with the determined organization.

19. The apparatus for establishing communication sessions as in claim 18 further comprising means for transferring a URL of the requester to the selected agent.

20. The apparatus for establishing communication sessions as in claim 14 further comprising means at the website for retrieving a set of requester designated shared files related to communication activity of the requester and not including cookies, and generated by the browser of the requester when the website identifies itself as being part of an associated file sharing network and for using the shared files to determine and control agent selection.

21. The apparatus for establishing communication sessions as in claim 20 further comprising means for detecting a set of file extensions of the shared files and for comparing the file extensions with a communications capability index and using the file extensions to retrieve a specific set of communications capabilities that the human agent needs to effectively communicate with the requester.

22. The apparatus for establishing communication sessions as in claim 21 wherein the means for selecting the agent further comprises means for searching for an agent with a communication capability index substantially equal to the requester.

23. The apparatus for establishing communication sessions as in claim 20 further comprising means for accessing requester contact lists containing URL's to web pages of competitors among the shared filed, and for detecting a URL of a competitor from the contact lists.

24. The apparatus for establishing communication sessions as in claim 23 wherein the URL of the competitor further comprises an identifier of a webpage of a specific product of the competitor and further comprising means for searching for an agent with knowledge of the specific product.

25. The apparatus for establishing communication sessions as in claim 14 wherein the means for analyzing comprises means for determining a location of the requester and wherein the means for selecting further comprises means for selecting a human agent closest to the location of the requester.

26. The apparatus for establishing communication sessions as in claim 14 further comprising means for comparing a domain name of a URL of the requester with a list of domain names and locations of known customers and detecting a matching customer, and wherein the means for selecting the agent further comprises means for searching for an agent with knowledge of any problem associated with the matching customer.

27. An apparatus for of establishing communication sessions through the Internet, such apparatus comprising:
a website adapted to receive a request from a browser of an Internet requester accessing the website, the request activated by the requester without entry by requestor of requester identification or location and forwarded to the website by the browser requesting a communication session with a human agent of the website;
a packet analyzer adapted to automatically analyze browser associated information relating to the request prior to an agent assignment without entry by the requestor of requester identification or location, wherein the browser associated information comprises at least one of information not entered by the requester delivered to a server along with the request from the browser, router information retrieved by the server based upon a URL of the browser, and information retrieved by the server from the browser about communication sessions with other servers, and a list of router identifiers defining a path from the internet requester to the website; and
an agent selection application adapted to automatically select a human agent for the communication session based upon a content including at least location information determined from the analyzed browser associated information.

28. The apparatus for establishing communication sessions as in claim 27 wherein the packet processor further comprises a TRACEROUTE application adapted to automatically retrieve the list of router identifiers defining a path from the Internet requester to the website.

29. The apparatus for establishing communication sessions as in claim 28 wherein the packet processor further comprises an agent selection application adapted to identify an agent in the identified locale of the closest relative router.

30. The apparatus for establishing communication sessions as in claim 29 wherein the agent selection application further comprises an agent lookup table adapted to retrieve a list of agents in the identified locale of the closest relative router.

31. The apparatus for establishing communication sessions as in claim 29 further comprising a communication processor adapted to transfer a URL of the requester to the selected agent.

32. The apparatus for establishing communication sessions as in claim 27 wherein the browser associated information further comprises a set of shared files related to communication activity of the requester and generated by the browser of the requester made available to the website from a browser of the requester when the website identifies itself as being part of an associated file sharing network.

33. The apparatus for establishing communication sessions as in claim 32 wherein the set of shared files further comprises a set of file extensions of the shared files.

34. The apparatus for establishing communication sessions as in claim 33 further comprising a file analyzer adapted to comparing the file extensions with a communications capability index.

35. The apparatus for establishing communication sessions as in claim 34 wherein the file analyzer further comprises a communication capability index.

36. The apparatus for establishing communication sessions as in claim 32 wherein the set of shared files further comprises a cookie left by another server.

* * * * *